United States Patent [19]
Richerson

[11] 3,974,106
[45] *Aug. 10, 1976

[54] CERAMIC ELECTRICAL RESISTANCE IGNITER

[75] Inventor: David W. Richerson, Tempe, Ariz.

[73] Assignee: Norton Company, Worcester, Mass.

[ * ] Notice: The portion of the term of this patent subsequent to June 17, 1992, has been disclaimed.

[22] Filed: May 22, 1974

[21] Appl. No.: 472,099

[52] U.S. Cl. ................................. 252/516; 106/44
[51] Int. Cl.$^2$ .......................................... H01B 1/04
[58] Field of Search ...................... 252/516; 106/44

[56] References Cited
UNITED STATES PATENTS

| | | | |
|---|---|---|---|
| 2,095,253 | 10/1937 | Heyroth | 252/516 X |
| 3,052,814 | 9/1962 | Edwards et al. | 313/131 R |
| 3,454,345 | 7/1969 | Dyre | 252/516 X |
| 3,890,250 | 6/1975 | Richerson | 252/516 |
| 3,895,219 | 7/1975 | Richerson et al. | 252/516 |

FOREIGN PATENTS OR APPLICATIONS 2,356,921   5/1974   Germany

OTHER PUBLICATIONS

Chemical Abstracts, vol. 75 (1971), 9395 p. "Sintering Conditions of High-Temperature Materials Based on Silicon Nitride and Carbide."

Chemical Abstracts, Vol. 79 (1973), 45098k, "Refractory Material."

Primary Examiner—Benjamin R. Padgett
Attorney, Agent, or Firm—Arthur A. Loiselle, Jr.

[57] ABSTRACT

A ceramic resistance gas igniter comprised of 10 to 60% by weight of silicon carbide and 40 to 90% by weight of silicon nitride, slicon oxynitride, or silicon aluminum oxynitride, and having a density preferably greater than 95% of the theoretical density of the composite. As a result of the combination of high density and composition, the igniters have moduli of rupture in excess of 80,000 p.s.i., a resistivity range of from 0.1 to $10^4$ ohm centimeters, and superior resistance to corrosive gases.

2 Claims, 3 Drawing Figures

CERAMIC ELECTRICAL RESISTANCE IGNITER

CROSS REFERENCE TO RELATED APPLICATIONS

The instant application is closely related to the subject matter of Applications Ser. No. 392,094, filed Aug. 27, 1973 in the name of David W. Richerson, now U.S. Pat. No. 3,890,250, entitled "HOT PRESSED SILICON NITRIDE CONTAINING FINELY DISPERSED SILICON CARBIDE", and Ser. No. 418,375, filed in the name of David W. Richerson and Gerald Q. Weaver, now U.S. Pat. No. 3,895,219, entitled "HEATER ELEMENT", said applications both having been assigned to Norton Company, Worcester, Massachusetts, the assignee of the present application. The subject matter of the earlier filed applications is hereby, in its entirety, incorporated by reference in the present application.

BACKGROUND OF THE INVENTION

The invention relates to igniters for fuel burning devices such as domestic and industrial appliances. More particularly the invention relates to ceramic resistance igniters for gas burning appliances such as kitchen ranges, furnaces, clothes dryers, and the like.

Non-pilot light igniters have been well-known, at least in principle, for many years. The earliest type were the incandescent wire devices, for example, an electrically heated platinum wire coil. Ceramic resistance igniters made their appearance about 1937. U.S. Pat. No. 2,089,394 describes an electrical ignition system in which a resistance igniter composed of "Durhy material" is utilized to ignite a fluid fuel system; Durhy is a sintered silicon carbide. In the same year, U.S. Pat. No. 2,095,253 issued, which described a U-shaped igniter for fuel burning systems where the igniter is composed of silicon carbide. The igniter element is formed by first preforming 120 grit (142 microns) and finer silicon carbide material to rods of suitable length which are then fired to presinter the silicon carbide. The rod is then cut into the desired length and slotted to form a U-shaped element which is subsequently impregnated with silicon metal. A second basic type of silicon carbide igniter is that described in U.S. Pat. No. 3,052,814. This is a sparkplug type igniter rather than the pure resistance type mentioned above and is composed of silicon nitride bonded silicon carbide. Another silicon igniter device is described in U.S. Pat. No. 3,282,324 as part of a complete ignition and heat detection system. In this case the silicon carbide is a sintered silicon carbide device having the relatively low resistance properties of 130 ohms at room temperature and 100 ohms at 1800°F.

By nature of their use, resistance igniters must be small in dimensions, particularly in terms of their cross section and overall hot zone. Prior art sintered silicon carbide igniters are very fragile. Attempts have been made to physically reinforce ceramic resistance igniters by such approaches as that described in U.S. Pat. Nos. 3,372,305 and 3,467,812. This igniter has a spiral configuration which is fabricated from a sintered tube of silicon carbide. The spiral configuration is supported by an aluminum oxide tube which passes through the opening of the spiral silicon carbide igniter body. Another type of resistance igniter described in U.S. Pat. NO. 3,454,345, is one composed of a sintered mixture of silicon carbide and silicon oxynitride wherein the silicon oxynitride functions as a bond for relatively coarse 10F silicon carbide, i.e., a mixture of particles 1340 microns and finer in size, with 10 percent by weight of silicon oxynitride. This silicon carbide/silicon oxynitride mixture is one manufactured and sold by the Norton Company, Worcester, Massachusetts, and its foreign affiliates under the trademark CRYSTOLON 63.

Despite a substantial amount of activity in the ceramic resistance igniter field, the igniters enjoying most widespread use today for most applications are still the pilot light type. In view of the current energy crisis and the result of various surveys which show that pilot lights consume from 10 to 15 percent of the total gas consumed in this country, there is obviously a compelling need for an igniter to replace the present widely used pilot light. Prior art ceramic resistance igniters have not successfully replaced pilot lights and perhaps will not, despite the dire need for such replacements, because most prior art resistance igniters consume an unacceptably large amount of power, are mechanically extremely weak and brittle, will not survive the extraordinary high number of heat-up and cool-down cycles required to make such an igniter commercially practical, and are too susceptible to deterioration in the hot corrosive environment in which such igniters must function.

It is therefore a principal object of the present invention to provide a ceramic resistance igniter for fuel burning devices which are free of the foregoing deficiencies.

SUMMARY OF THE INVENTION

The resistance igniter of the present invention overcomes the disadvantages of prior art igniters. The composition of the subject igniters can vary from 10 percent by weight of silicon carbide and 90 percent by weight of silicon nitride, to 60 percent by weight of silicon carbide and 40 percent by weight of silicon nitride, both materials having a particle size of 10 microns or less. Silicon oxynitride, silicon aluminum oxynitride, or mixtures of these with silicon nitride may be used in place of the silicon nitride. The resulting electrical characteristics are widely variable and closely controllable. For example, within this compositional range, ignition devices can be fabricated with room temperature resistivities of from approximately 0.1 ohm centimeter for the high silicon carbide mixtures, to $10^4$ ohm centimeters for the high silicon nitride species. This provides igniters which require low power and which can be used directly off ordinary line voltage without the requirement of a transformer. This compositional latitude also makes it possible to form monolithic igniters with terminal connecting ends of very low resistance, while having the necessary higher resistance in the intermediate or hot zone of the igniter configuration; this differential is preferably such that the resistance of the ends is less than 75 percent of the resistance of the intermediate zone. Thus a great degree of freedom in igniter design is provided. The igniter can be designed with terminal connecting ends of relatively large cross-sectional area, up to 100 times the cross-section of the intermediate zone, which reduces the resistance of said ends, the ends may be very low in silicon nitride which has the same result, or the ends may be treated with metals, as is well known in the art, again having the same end result. Obviously all three of these approaches may be combined to make extremely effective cold ends.

Because the present igniters are at least 90 percent and preferably 95 percent of theoretical density, the resulting ceramic bodies have room temperature moduli of rupture, under 3 point loading in excess of 80,000 p.s.i., providing for the first time, a resistance igniter material that allows igniters to be made in the relatively small size that is required by the devices and appliances in which they are used. Gas clothes dryer manufacturers, for example, require that an igniter for such an appliance must withstand 125 g's. Prior art igniters could not withstand such a severe test without reinforcing these igniters in some manner, such as that shown in U.S. Pat. Nos. 3,372,305 and 3,467,812 wherein a hollow spiral silicon carbide igniter must be reinforced with an alumina rod located centrally therein. The high density of the invention igniters is also extremely important for its effect on the oxidation resistance of the igniter structure. With a density of 95 percent of theoretical or better, the porosity that is present is not interconnecting so the structure is effectively impervious to the corrosive gaseous environment in which such a device functions.

An additional stringent requirement of igniters for some applications, is a very rapid response time, i.e., that time required to bring the igniter from room temperature to the ignition temperature of the fuel being burned. In kitchen ranges the gas must be ignited in a matter of seconds. In gas clothes dryers or gas and liquid fuel burning furnaces, longer ignition temperatures are acceptable e.g. 1000°C in 3 minutes, but to avoid the danger of fuel spillage, additional controls are required to postpone introduction of fuel until the igniter element is up to ignition temperature; thus even here, rapid attainment of ignition temperature is highly desirable, though not an operational necessity. The igniters of the present invention can be tailored to have response times anywhere from several seconds to three minutes. Presently the generally accepted maximum response time for igniters for most applications is that the igniter must attain ignition temperature of about 1000°C within 60 seconds; the present invention meets these requirements.

DESCRIPTION OF THE PREFERRED EMBODIMENTS

Figure 1:
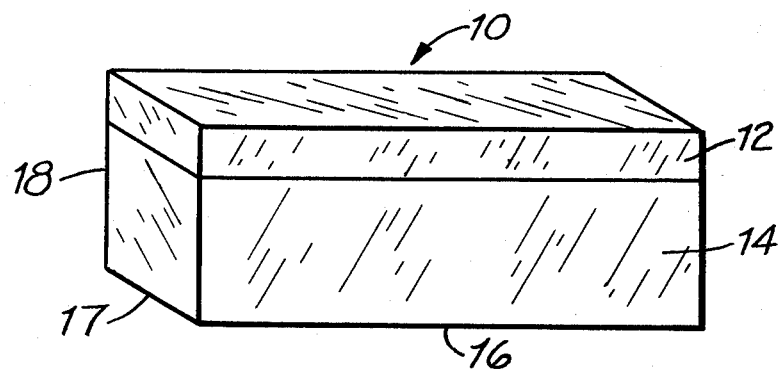
FIG. 1 is a hot-pressed billet composed of an upper layer of a mixture of silicon carbide and silicon nitride, and a lower layer of these two materials but containing more silicon carbide than the upper layer.

There are several well-known prior art methods for forming refractory bodies which are amenable to the fabrication of igniter elements which are approximately 90% of the theoretical density of the materials used. A silicon carbide-silicon nitride mixture of the proper proportions and proper particle size distribution may be pressed at room temperature in an appropriately shaped mold setup. The green preform may then be fired in a closely programmed firing cycle to facilitate sintering of the particles of the mixture. When this approach is used, the mix must be cold formed at extremely high pressures to get as much densification as possible. The subsequent firing cycle is generally long and at relatively high temperatures to cause further densification of the refractory shape. Similarly, the refractory shape may be slip cast by well-known techniques followed by drying of the cast shape; and subsequently the green shape must be subjected to firing cycles similar to those to which the cold pressed forms are submitted in order to promote as much densification as possible. This approach is probably the least desirable; however, it is operable to form refractory shapes, and in this case igniter shapes, having densities in the range of 90% of theoretical. An additional method for forming the igniters of the present invention involve a modification of the process currently referred to as reaction bonding. In this approach, silicon carbide powder of the proper particle size is mixed with a predetermined amount of powdered silicon metal and the mixture cold formed into the desired shape. Finally, the green shape is subjected to heat and nitrogen whereby the silicon is converted in situ to silicon nitride in the interstices between the silicon carbide particles. Still a further method is that wherein a mixture of silicon nitride and carbon or a carbon generating material is used to form a green refractory shape. The green configuration is then subjected to heat and silicon vapor, or the green preform is impregnated with molten silicon metal, which causes the formation of silicon carbide in the interstices between the silicon nitride particles. This latter method is most amenable when the composition of the igniters is to be high in silicon nitride.

However, for igniters having densities 95% of theoretical or higher, the foregoing methods either are inadequate or unreliable. The preferred method for forming higher density igniters is the hot press method whereby the appropriate mixture of silicon carbide and silicon nitride are simultaneously subjected to heat and pressure resulting in igniters close to theoretical density. Hot-pressing of ceramics, with its permutations and variations, is well known in the art; all of these process variations are amenable, for the most part, to the fabrication of the present igniters.

Cold terminal ends are almost a requirement for successful long term operation of a ceramic resistance igniter. Cold ends can be formed by several methods, as mentioned above. The preferred approach is the compositional one. By forming the terminal connecting ends of a mixture of from 12 to 60% by weight of silicon carbide, and 38 to 88% by weight of silicon nitride, the resistance of the terminal connecting ends is less than 75% of the resistance of the intermediate or hot zone, which results in the ends remaining relatively cool. There should however be at leat a 2% by weight excess of silicon carbide in said ends over the intermediate zone. From the following examples, the utility and versatility of the present igniters will be readily apparent.

EXAMPLE I

Figures 2, 3:
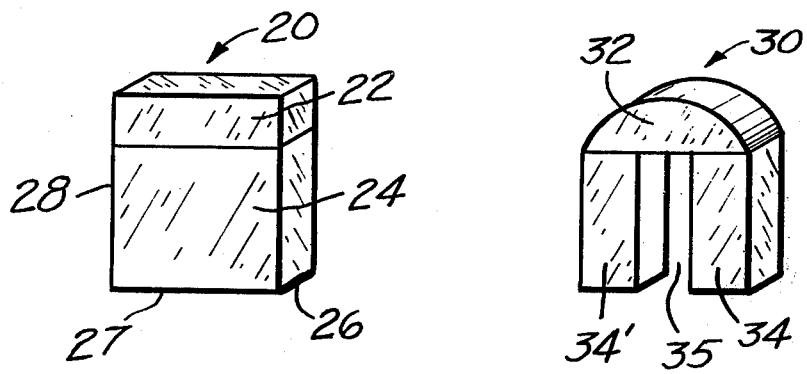
FIG. 2 is an igniter blank cut from the billet of FIG. 1.
FIG. 3 is an igniter formed from the blank of FIG. 2.

A composite billet 10, such as that shown in FIG. 1, measuring approximately 5 inches in length 16, 0.9 inch in height 18 and 0.45 inch in thickness 17 was hot-pressed in a graphite mold assembly. With the top plunger of mold removed, the cavity therein was about ¾ filled with a finer than 10 micron mixture made up of 60% by weight of silicon nitride and 40% by weight of silicon carbide and the powder spread level. On top of the foregoing was spread a finer than 10 micron mixture of 70% by weight of silicon nitride and 30% by weight of silicon carbide. The top plunger was put in place and the powders were hot-pressed at 1775°C for 60 minutes. Referring to FIG. 1, the 70-30 layer is indicated by 12 and the 60-40 layer by 14. The layers are integral with each other forming a monolithic structure. The billet of FIG. 1 was then sliced into blanks 20 shown in FIG. 2, measuring 0.9 inch on the side 28, 0.45 on the side shown as 27, and 0.125 on the side 26. The 70-30 compositional stratum is shown as 22, and the 60-40 section as 24. The blanks 20 of FIG. 2 were then taken and a slot was cut therein with a diamond cut-off wheel, the slot commencing at end of the 60-40 section opposite the 70-30 section and traversing the entire length of 24 to the interface between 22 and 24. The end result was FIG. 3, a U-shaped ceramic igniter 30 having a hot zone 32, which may have rounded corners as shown, two legs 34 and 34' which constituted the terminal connecting ends, formed by the slot 35. The small hot zone 32 of the igniter attained a stable ignition temperature of 1350°C in less than 30 seconds at 110 volts and 1.5 amps while the legs 34 and 34' remained relatively cool.

EXAMPLE II

A series of rod shaped igniters were formed by hot-pressing in a manner similar to that in Example I, the rods measuring 0.125 × 0.125 × 2 inches and varied in composition of from 60 to 80% by weight of silicon nitride and from 20 to 40% by weight of silicon carbide. The resulting rods were tested for mechanical strength and electrical properties with the following results:

| Composition ($Si_3N_4$/SiC) Wt % | Density (g/cc) | MOR by 3-point bending 75°F (psi) | MOR by 3-point bending 2500°F (psi) | Resistivity 75°F (ohm-cm) | Resistivity 2500°F (ohm-cm) | (ohm-cm) |
|---|---|---|---|---|---|---|
| 80/20 | 3.05 | 121,800 | 58,700 | 136 | — | |
| 70/30 | 3.18 | 105,400 | 46,700 | 4.5 | ~1-2 | |
| 60/40 | 3.03 | 106,500 | 46,800 | 1.9 | ~0.2-0.5 | |

The excellent mechanical strength and broad variability of electrical properties is apparent from the foregoing. The optimum composition is 20 to 40% by weight of silicon carbide and 60 to 80% by weight of silicon nitride, silicon oxynitride, silicon aluminum oxynitride or mixtures thereof. This results in igniters with the most desirable mechanical strength i.e. a flexural strength of at least 100,000 p.s.i. at room temperature under 3 point loading, and a most preferred resistivity range of about 2 to 200 ohm centimeters.

The foregoing is merely intended to be illustrative of the present invention and is not intended to be limiting. Other variations within the scope of the present invention may become apparent to one skilled in the art e.g. igniter shapes other than those specifically described and various known methods of lowering the resistance of the terminal connecting ends by increasing the cross section thereof or by coating said ends with a metal or metal alloy. All of said variations are within the scope of the appended claims as additions and modifications thereof.

What is claimed is:

1. A ceramic resistance igniter comprising a sintered mixture of from 10 to 60% by weight of silicon carbide having an average grain size of 10 microns or less, and 40 to 90% by weight of a material selected from the group consisting of silicon nitride, silicon aluminum oxynitride, silicon oxynitride and mixtures thereof, material having an average grain size of 10 microns or less; and sintered mixture having a density of at least 90% of its theoretical density, a room temperature resistivity of from 0.1 to $10^4$ ohm centimeters, a modulus of rupture in excess of 80,000 p.s.i. measured at room temperature and under 3 point loading, and having a resistance differential between the terminal connecting ends of said igniter and the intermediate zone thereof; the resistance of said terminal ends being less than 75% of that of said intermediate zone, and having a composition of from 12 to 60% by weight of silicon carbide and 38 to 88% by weight of a material selected from the group consisting of silicon nitride, silicon oxynitride, silicon aluminum oxynitride, and mixtures thereof, said silicon carbide content being at least 2% by weight higher than that of the intermediate zone; said igniter being capable of attaining a temperature of at least 1000°C within 3 minutes.

2. A ceramic resistance igniter comprising a sintered mixture of from 20 to 40% by weight of silicon carbide and 60 to 80% by weight of a material selected from the group consisting of silicon nitride, silicon oxynitride, silicon aluminum oxynitride, and mixtures thereof, said sintered mixture having a density of at least 95% of its theoretical density, a room temperature resistivity of from 2 to 200 ohm centimeters, a 3 point load room temperature modulus of rupture of at least 100,000 p.s.i., said sintered silicon carbide having an average grain size of 10 microns or less, and said igniter having a resistance differential between its terminal connecting ends and the intermediate zone thereof, the resistance of said terminal connecting ends being at least 25% lower than the resistance of said intermediate zone, said intermediate zone being capable of attaining a temperature of at least 1000°C within 60 seconds.

* * * * *